(12) United States Patent
Yamada

(10) Patent No.: US 7,998,229 B2
(45) Date of Patent: Aug. 16, 2011

(54) POLISHING COMPOSITION AND POLISHING METHOD

(75) Inventor: Shuhei Yamada, Nagoya (JP)

(73) Assignee: Fujimi Incorporated, Kiyosu-shi, Aichi (JP)

( * ) Notice: Subject to any disclaimer, the term of this patent is extended or adjusted under 35 U.S.C. 154(b) by 146 days.

(21) Appl. No.: 11/701,640

(22) Filed: Feb. 2, 2007

(65) Prior Publication Data

US 2007/0181851 A1  Aug. 9, 2007

(30) Foreign Application Priority Data

Feb. 7, 2006 (JP) .................. 2006-030108

(51) Int. Cl.
*B24D 3/02* (2006.01)
*C09C 1/68* (2006.01)
*C09K 3/14* (2006.01)
*C09G 1/02* (2006.01)

(52) U.S. Cl. .................. 51/308; 51/302; 51/303; 106/3

(58) Field of Classification Search .................. 51/302, 51/303, 308; 106/3; 438/689
See application file for complete search history.

(56) References Cited

U.S. PATENT DOCUMENTS

| | | | |
|---|---|---|---|
| 3,715,842 A | 2/1973 | Tredinnick et al. ............. 51/281 |
| 4,169,337 A | 10/1979 | Payne ............................. 51/283 |
| 4,462,188 A | 7/1984 | Payne ............................. 51/283 |
| 4,588,421 A | 5/1986 | Payne ............................. 51/308 |
| 5,230,833 A | 7/1993 | Romberger et al. ....... 252/363.5 |
| 5,300,130 A * | 4/1994 | Rostoker ......................... 51/309 |
| 5,352,277 A | 10/1994 | Sasaki ................. 106/6 |
| 5,885,334 A * | 3/1999 | Suzuki et al. ..................... 106/3 |
| 5,916,819 A | 6/1999 | Skrovan et al. ............... 438/692 |
| 6,099,604 A | 8/2000 | Sandhu et al. .................. 51/307 |
| 6,454,820 B2 | 9/2002 | Hagihara et al. ............... 51/308 |
| 6,852,009 B2 | 2/2005 | Kawase et al. .................. 451/36 |
| 2001/0003672 A1 | 6/2001 | Inoue et al. .................... 438/690 |
| 2004/0098924 A1* | 5/2004 | Iwasa ............................. 51/302 |
| 2004/0127047 A1 | 7/2004 | Yamada et al. ............... 438/690 |
| 2004/0258665 A1* | 12/2004 | Sista et al. .................... 424/93.2 |
| 2005/0054203 A1 | 3/2005 | Yamada ....................... 438/695 |
| 2005/0090104 A1* | 4/2005 | Yang et al. .................... 438/689 |
| 2005/0287931 A1* | 12/2005 | Saegusa et al. ................. 451/41 |

FOREIGN PATENT DOCUMENTS

| | | |
|---|---|---|
| EP | 1 403 351 A1 | 9/2003 |
| EP | 1 405 885 A2 | 9/2003 |
| EP | 1 424 727 A1 | 9/2003 |
| EP | 1 512 732 A1 | 9/2004 |
| GB | 2 383 797 A | 11/2002 |
| GB | 2 383 797 A | 7/2003 |
| JP | 04-291722 | 10/1992 |
| JP | 2004359831 * | 12/2004 |
| WO | 99/32570 | 7/1999 |
| WO | 2004/042812 A1 | 5/2004 |

* cited by examiner

*Primary Examiner* — Anthony J Green
*Assistant Examiner* — Pegah Parvini
(74) *Attorney, Agent, or Firm* — Vidas, Arrett & Steinkraus P.A.

(57) ABSTRACT

The polishing composition contains polyoxyethylene sorbitan mono-fatty acid ester, silicon dioxide, water soluble cellulose, an alkaline compound, and water. The content of polyoxyethylene sorbitan mono-fatty acid ester in the polishing composition is less than 0.0025% by mass. The polishing composition is appropriate for final polishing of silicon wafers.

7 Claims, No Drawings

POLISHING COMPOSITION AND POLISHING METHOD

BACKGROUND OF THE INVENTION

The present invention relates to a polishing composition which is used, for example, in final polishing of a silicon wafer, and to a polishing method using this polishing composition.

As a conventional polishing composition used in final polishing of silicon wafers, the polishing composition disclosed in Japanese Laid-Open Patent Publication No. 4-291722 is known. This polishing composition contains a nonionic surfactant of which the HLB value is no less than 13 and less than 20, so that the haze on the surface of the silicon wafer after polishing is suppressed. As the nonionic surfactant of which the HLB value is no less than 13 and less than 20, the publication discloses nonylphenol to which ethylene oxide is added, para-cumenyl phenol to which ethylene oxide is added, primary alcohols of which the carbon number is 12 or 13 to which ethylene oxide is added, block polymers of ethylene oxide and propylene oxide and the like. Polishing compositions containing these nonionic surfactants, however, do not have satisfactory performance as currently required in terms of suppressing haze on the surface of silicon wafers.

SUMMARY OF THE INVENTION

An object of the present invention is to provide a polishing composition which is appropriate for use in final polishing of silicon wafers, and a polishing method using this polishing composition.

In order to achieve the above object, the present invention provides a polishing composition which contains polyoxyethylene sorbitan mono-fatty acid ester, silicon dioxide, water soluble cellulose, an alkaline compound, and water, where the content of the polyoxyethylene sorbitan mono-fatty acid ester in the polishing composition is less than 0.0025% by mass.

The present invention also provides a polishing method for a silicon wafer which includes final polishing of a silicon wafer using the above described polishing composition.

DETAILED DESCRIPTION OF THE PREFERRED EMBODIMENTS

In the following, one embodiment of the present invention will be described.

A polishing composition according to the present embodiment is gained by mixing together polyoxyethylene sorbitan mono-fatty acid ester, silicon dioxide, water soluble cellulose, an alkaline compound, and water, and contains polyoxyethylene sorbitan mono-fatty acid ester, silicon dioxide, water soluble cellulose, an alkaline compound, and water. This polishing composition is used in, for example, final polishing of silicon wafers.

The polyoxyethylene sorbitan mono-fatty acid ester in the polishing composition has working effects of suppressing the haze on the surface of a silicon wafer when the silicon wafer is polished using the polishing composition.

The polyoxyethylene sorbitan mono-fatty acid ester can be represented by the following formula. In the formula, R indicates an alkyl group or an alkenyl group, and a, b and c indicate natural numbers.

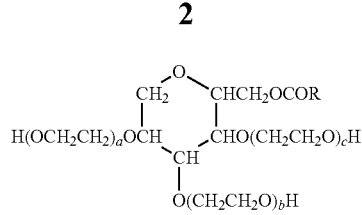

It is essential in order to gain a polishing rate (a removal rate) for practical use that the content of polyoxyethylene sorbitan mono-fatty acid ester in the polishing composition be less than 0.0025% by mass. Here, in the case where the content exceeds 0.0015% by mass, there is a risk that the wettability on the surface of the silicon wafer may be lowered when the silicon wafer is polished using the polishing composition, and thereby, particles may easily attach on the surface of the silicon wafer. Accordingly, in order to reduce the amount of particles that attach on the surface of the silicon wafer when the silicon wafer is polished using the polishing composition, it is preferable that the content of polyoxyethylene sorbitan mono-fatty acid ester in the polishing composition be no more than 0.0015% by mass. Meanwhile, in the case where the content of polyoxyethylene sorbitan mono-fatty acid ester in the polishing composition is less than 0.000025% by mass, more specifically less than 0.00005% by mass, and even more specifically less than 0.0005% by mass, the content of polyoxyethylene sorbitan mono-fatty acid ester is insufficient, and thus, there is a risk that the haze on the surface of the silicon wafer may not be well suppressed. Accordingly, in order to suppress the haze with more certainty, it is preferable that the content of polyoxyethylene sorbitan mono-fatty acid ester in the polishing composition be no less than 0.000025% by mass, more preferably no less than 0.00005% by mass, and most preferably no less than 0.0005% by mass.

In the case where the HLB value of the polyoxyethylene sorbitan mono-fatty acid ester contained in the polishing composition is less than 8, more specifically less than 11, and even more specifically less than 14, the affinity of the polyoxyethylene sorbitan mono-fatty acid ester with the solvent in the polishing composition is low, and thus, there is a risk that the haze on the surface of the silicon wafer may not be well suppressed. Accordingly, in order to suppress the haze with more certainty, it is preferable that the HLB value of the polyoxyethylene sorbitan mono-fatty acid ester contained in the polishing composition be no less than 8, more preferably no less than 11, and most preferably no less than 14. Meanwhile, in the case where the HLB value of the polyoxyethylene sorbitan mono-fatty acid ester contained in the polishing composition exceeds 18, and more specifically exceeds 17, there is a risk that the haze on the surface of the silicon wafer may not be well suppressed. Accordingly, in order to suppress the haze with more certainty, it is preferable that the HLB value of the polyoxyethylene sorbitan mono-fatty acid ester contained in the polishing composition be no more than 18, and more preferably no more than 17.

The silicon dioxide in the polishing composition works to mechanically polish a silicon wafer.

It is preferable that the silicon dioxide included in the polishing composition be colloidal silica or fumed silica, and more preferably colloidal silica. In the case where the silicon dioxide included in the polishing composition is colloidal silica or fumed silica, particularly in the case where it is colloidal silica, the number of scratches caused on the surface of the silicon wafer is reduced when a silicon wafer is polished using the polishing composition.

In the case where silicon dioxide included in the polishing composition is colloidal silica, it is preferable that the average primary particle diameter of the colloidal silica be 5 nm to 300 nm, more preferably 5 nm to 200 nm, and most preferably 5 nm to 120 nm. Meanwhile, in the case where the silicon dioxide included in the polishing composition is fumed silica, it is preferable that the average primary particle diameter of the fumed silica be 10 nm to 300 nm, more preferably 10 nm to 200 nm, and most preferably 10 nm to 120 nm. In the case where the average primary particle diameter is too small, there is a risk that the polishing rate for a silicon wafer using the polishing composition may be insufficient for practical use. In the case where the average primary particle diameter is too large, there is a risk that the number of scratches caused on the surface of the silicon wafer may increase or the haze or the roughness on the surface of the silicon wafer may worsen when a silicon wafer is polished using the polishing composition. Here, the average primary particle diameter of colloidal silica and fumed silica is calculated on the basis of the specific surface area of the colloidal silica or fumed silica, which is measured in accordance with a method for measuring a specific surface area of a powder using gas adsorption (BET method), and the particle density of the colloidal silica or fumed silica.

In addition, in the case where the silicon dioxide included in the polishing composition is colloidal silica, it is preferable that the average secondary particle diameter of the colloidal silica be 5 nm to 300 nm, more preferably 5 nm to 200 nm, and most preferably 5 nm to 150 nm. In the case where the silicon dioxide included in the polishing composition is fumed silica, it is preferable that the average secondary particle diameter of the fumed silica be 30 nm to 500 nm, more preferably 40 nm to 400 nm, and most preferably 50 nm to 300 nm. In the case where the average secondary particle diameter is too small, there is a risk that the polishing rate for a silicon wafer using the polishing composition may be insufficient for practical use. In the case where the average secondary particle diameter is too large, there is a risk that the number of scratches on the surface of the silicon wafer may increase, or the haze or the roughness on the surface of the silicon wafer may worsen. Here, the average secondary particle diameter of colloidal silica and fumed silica is measured in accordance with a laser beam scattering method.

In the case where the content of silicon dioxide in the polishing composition is less than 0.005% by mass, more specifically less than 0.05% by mass, and even more specifically less than 0.15% by mass, there is a risk that the polishing rate for a silicon wafer using the polishing composition may be insufficient for practical use. Accordingly, in order to gain a polishing rate which is sufficient for practical use, it is preferable that the content of silicon dioxide in the polishing composition be no less than 0.005% by mass, more preferably no less than 0.05% by mass, and most preferably no less than 0.15% by mass. Meanwhile, in the case where the content of silicon dioxide in the polishing composition exceeds 2.5% by mass, more specifically 1.25% by mass, and even more specifically 0.75% by mass, there is a risk that the haze on the surface of the silicon wafer may not be well suppressed, due to too much increase in the mechanical polishing ability of the polishing composition. Accordingly, in order to suppress the haze with more certainty, it is preferable that the content of silicon dioxide in the polishing composition be no more than 2.5% by mass, more preferably no more than 1.25% by mass, and most preferably no more than 0.75% by mass.

In order to prevent the silicon wafer from being contaminated with a metal when a silicon wafer is polished using the polishing composition, it is desirable for the silicon dioxide included in the polishing composition to include as little impurity metal as possible. Concretely, in the case where a 1% by mass dispersing liquid of silicon dioxide is prepared using the silicon dioxide included in the polishing composition, it is preferable that the total of the contents of iron, nickel, copper, calcium, chromium and zinc in the dispersing liquid be no more than 15 ppm, more preferably no more than 5 ppm, and most preferably no more than 0.015 ppm.

The alkaline compound in the polishing composition works to chemically polish a silicon wafer.

It is preferable that, from the point of view of increasing the polishing rate, the alkaline compound included in the polishing composition be at least one type selected from the group consisting of ammonium, potassium hydroxide, sodium hydroxide, tetramethylammonium hydroxide, tetraethylammonium hydroxide, ammonium hydrogen carbonate, ammonium carbonate, potassium hydrogen carbonate, potassium carbonate, sodium hydrogen carbonate, sodium carbonate, methyl amine, dimethyl amine, trimethyl amine, ethyl amine, diethyl amine, triethyl amine, ethylenediamine, monoether amine, N-(β-aminoethyl)ethanolamine, hexamethylenediamine, diethylenetriamine, triethylenetetramine, piperazine anhydride, piperazine hexahydrate, 1-(2-aminoethyl)piperazine, and N-methyl piperazine. In addition, it is preferable that, from the point of view of preventing the silicon wafer from being contaminated with a metal when a silicon wafer is polished using the polishing composition, the alkaline compound included in the polishing composition be at least one type selected from the group consisting of ammonium, ammonium salts, alkaline metal hydroxides, alkaline metal salts and quaternary ammonium hydroxides. It is more preferable for it to be selected from the group consisting of ammonium, potassium hydroxide, sodium hydroxide, tetramethylammonium hydroxide, tetraethylammonium hydroxide, ammonium hydrogen carbonate, ammonium carbonate, potassium hydrogen carbonate, potassium carbonate, sodium hydrogen carbonate, and sodium carbonate, and it is most preferable for it to be selected from the group consisting of ammonium, potassium hydroxide, sodium hydroxide, tetramethylammonium hydroxide, and tetraethylammonium hydroxide.

In the case where the alkaline compound included in the polishing composition is ammonium, an ammonium salt, an alkaline metal hydroxide, an alkaline metal salt or a quaternary ammonium hydroxide, it is preferable that the content of the alkaline compound in the polishing composition be 0.0025% by mass to 0.5% by mass, more preferably 0.005% by mass to 0.4% by mass, and most preferably 0.01% by mass to 0.25% by mass. Meanwhile, in the case where the alkaline compound included in the polishing composition is piperazine anhydride, piperazine hexahydrate, 1-(2-aminoethyl) piperazine or N-methyl piperazine, it is preferable that the content of the alkaline compound in the polishing composition be 0.0005% by mass to 0.3% by mass, more preferably 0.001% by mass to 0.15% by mass, and most preferably 0.01% by mass to 0.05% by mass (here, for the piperazine hexahydrate, the value is converted to that for piperazine anhydride through calculation). In the case where the content of the alkaline compound in the polishing composition is too small, there is a risk that the polishing rate for the silicon wafer using the polishing composition may be insufficient for practical use. In the case where the content of the alkaline compound in the polishing composition is too large, there is a risk that the polishing composition may be converted to a gel or the surface of the silicon wafer may become coarse when a silicon wafer is polished using the polishing composition.

The water soluble cellulose in the polishing composition has working effects of improving the wettability on the surface of the silicon wafer when a silicon wafer is polished using the polishing composition.

It is preferable that the water soluble cellulose included in the polishing composition be hydroxyalkyl cellulose or carboxyalkyl cellulose having an alkyl group of which the carbon number is 1 to 4, because these have strong working effects of improving the wettability. Concretely, it is preferable for it to be hydroxyethyl cellulose, hydroxypropyl cellulose or carboxymethyl cellulose, and it is more preferable for it to be hydroxyethyl cellulose.

It is preferable that the viscosity average molecular weight of the water soluble cellulose included in the polishing composition be 100,000 to 3,000,000, more preferably 200,000 to 2,000,000, and most preferably 300,000 to 1,500,000. In the case where the viscosity average molecular weight of the water soluble cellulose included in the polishing composition is too small, there is a risk that the haze on the surface of the silicon wafer may not be well suppressed when a silicon wafer is polished using the polishing composition. In contrast, in the case where it is too large, the viscosity of the polishing composition increases excessively, making handling difficult, and there is a risk that the polishing composition may be converted to a gel.

In the case where the content of water soluble cellulose in the polishing composition is less than 0.0005% by mass, more specifically less than 0.0025% by mass, and even more specifically less than 0.005% by mass, there is a risk that the wettability on the surface of the silicon wafer may not sufficiently improve when a silicon wafer is polished using the polishing composition. Accordingly, in order to improve the wettability on the surface of the silicon wafer with more certainty, it is preferable that the content of water soluble cellulose in the polishing composition be no less than 0.0005% by mass, more preferably no less than 0.0025% by mass, and most preferably no less than 0.005% by mass. Meanwhile, in the case where the content of water soluble cellulose in the polishing composition exceeds 0.15% by mass, more specifically 0.1% by mass, and even more specifically 0.05% by mass, the viscosity of the polishing composition increases excessively, making handling difficult, and there is a risk that the polishing composition may be converted to a gel. Accordingly, in order to optimize the viscosity of the polishing composition and prevent the polishing composition from being converted to a gel, it is preferable that the content of water soluble cellulose in the polishing composition be no more than 0.15% by mass, more preferably no more than 0.1% by mass, and most preferably no more than 0.05% by mass.

As described above, the polishing composition according to the present embodiment contains polyoxyethylene sorbitan mono-fatty acid ester, silicon dioxide, water soluble cellulose, an alkaline compound, and water, and the content of the polyoxyethylene sorbitan mono-fatty acid ester in the polishing composition is less than 0.0025% by mass. Therefore, a polishing rate which is sufficient for practical use can be gained when a silicon wafer is polished using the polishing composition, and at the same time, the haze on the surface of the silicon wafer is effectively suppressed. Accordingly, the polishing composition according to the present embodiment is particularly appropriate for final polishing of a silicon wafer.

The above described embodiment may be modified in the following manner.

A chelating agent, a water soluble polymer, a surfactant, an antiseptic agent, a mildewproofing agent, a rust inhibitor or the like may be added to the polishing composition according to the above described embodiment if necessary.

The polishing composition according to the above described embodiment may be used in polishing objects other than a silicon wafer.

The polishing composition according to the above described embodiment may be prepared by diluting an undiluted solution of the polishing composition with water. The ratio of dilution is preferably no more than 50 times, more preferably no more than 40 times, and most preferably no more than 30 times. The undiluted solution has a small volume in comparison with the polishing composition, and therefore, is easy to store and transport. Here, in the case where the concentration of the undiluted solution is too high, the viscosity of the undiluted solution becomes too high, making handling difficult at the time of storage and at the time of diluting, and sometimes the undiluted solution is converted to a gel.

Next, examples and comparative examples of the present invention are described.

An appropriate amount of polyoxyethylene sorbitan mono-fatty acid ester or a compound which is a substitute for this, silicon dioxide, water soluble cellulose or a compound which is a substitute for this, an alkaline compound, and water were mixed, and thereby, polishing compositions of Examples 1 to 15 and Comparative Examples 1 to 15 were prepared. The details of the polyoxyethylene sorbitan mono-fatty acid ester or compound which is a substitute for this, the water soluble cellulose or compound which is a substitute for this, and the alkaline compound in the polishing compositions of Examples 1 to 15 and Comparative Examples 1 to 15 are shown in Table 1. Here, the silicon dioxide included in the polishing compositions of Examples 1 to 15 and Comparative Examples 1 to 15 were all colloidal silica, and the average primary particle diameter of this colloidal silica was 35 nm, the average secondary particle diameter was 70 nm, and the content of the colloidal silica in each polishing composition was 0.5% by mass. The average primary particle diameter of the colloidal silica was calculated on the basis of the specific surface area, which is measured using FlowSorb II 2300 made by Micromeritics Instrument Corporation, and the particle density. The average secondary particle diameter of the colloidal silica was measured using an N4 Plus Submicron Particle Sizer made by Beckman Coulter Inc.

In Table 1, "S12" indicates polyoxyethylene sorbitan monolaurate (HLB value: 16.7), "S16" indicates polyoxyethylene sorbitan monopalmitate (HLB value: 15.7), "S18" indicates polyoxyethylene sorbitan monostearate (HLB value: 14.9), "S18*" indicates polyoxyethylene sorbitan monooleate (HLB value: 15.0), "PG1" indicates polyoxyethylene alkyl ether (where the alkyl group is a lauryl group or a palmityl group), "PG2" indicates polyethylene lauryl ether, "HEC" indicates hydroxy ethyl cellulose having an average molecular weight of 1,200,000, "PVA" indicates polyvinyl alcohol having a degree of saponification of no less than 98% and a degree of polymerization of no less than 500, "PEO" indicates polyethylene oxide having an average molecular weight of 150,000 to 400,000, "POEPOP" indicates polyoxyethylene polyoxypropylene glycol in which the mass ratio of the oxyethylene group to the oxypropylene group is 80/20, "$NH_4OH$" indicates ammonium, "KOH" indicates potassium hydroxide, "TMAH" indicates tetramethylammonium hydroxide, and "PIZ" indicates piperazine.

Silicon wafers were polished using the polishing compositions of Examples 1 to 15 and Comparative Examples 1 to 15 under the conditions shown in Table 2. The polished silicon wafers had been polished in advance using a polishing agent "RDS-10310," made by Fujimi Incorporated, the silicon wafers had a diameter of 200 mm, a conductivity type P, a crystal orientation of <100>, a specific resistance of no less than 0.1 Ω·cm and less than 100 Ω·cm.

The column "haze" in Table 1 shows the results of evaluation of the haze level on the silicon wafer after polishing on the basis of the measured value gained by supplying a silicon wafer to a "Surfscan SP1TBI," which is a wafer inspection unit made by KLA-Tencor Corporation, after polishing. In the column "haze," ○○ (excellent) indicates that the measured value was less than 0.05 ppm, ○ (good) indicates that the measured value was no less than 0.05 ppm and less than 0.06 ppm, Δ (acceptable) indicates that the measured value was no less than 0.06 ppm and less than 0.08 ppm, and x (poor) indicates that the measured value was no less than 0.08 ppm.

The column "visually observed haze" in Table 1 shows the results of evaluation of the degree of brown haze observed when a silicon wafer was irradiated with a spotlight of 500 kilo-lux within a darkroom after polishing. In the column "visually observed haze," ○ (good) indicates that no brown haze was observed, Δ (somewhat poor) indicates that faint brown haze was observed, and x (poor) indicates that dark brown haze was observed.

The column "particles" in Table 1 shows the results of evaluation in terms of the number of particles having a size of no less than 0.065 μm which existed on the surface of a silicon wafer after polishing, as measured using a "Surfscan SP1TBI." In the column "particles," ○ (good) indicates that the number of particles per wafer was less than 50, Δ (somewhat poor) indicates that the number was no less than 50 and less than 200, and x (poor) indicates that the number was no less than 200.

The column "scratches" in Table 1 shows the results of evaluation in terms of the number of scratches on the surface of a silicon wafer after polishing, as measured using a "Surfscan SP1TBI." When the number of scratches per wafer was 0, the evaluation was ○ (good), when the number was no less than 1 and less than 5, the evaluation was Δ (somewhat poor), and when the number was no less than 5, the evaluation was x (poor).

TABLE 1

| Item | Polyoxyethylene sorbitan mono-fatty acid ester or compound which is substitute for this Type | Content [% by mass] | Water soluble cellulose or compound which is substitute for this Type | Content [% by mass] | Alkaline compound Type | Content [% by mass] | Haze | Visually observed haze | Particles | Scratches |
|---|---|---|---|---|---|---|---|---|---|---|
| Comparative Example 1 | — | — | HEC | 0.0125 | NH$_4$OH | 0.015 | Δ | ○ | ○ | ○ |
| Example 1 | S12 | 0.00005 | HEC | 0.0125 | NH$_4$OH | 0.015 | ○ | ○ | ○ | ○ |
| Example 2 | S12 | 0.0005 | HEC | 0.0125 | NH$_4$OH | 0.015 | ○○ | ○ | ○ | ○ |
| Example 3 | S12 | 0.0015 | HEC | 0.0125 | NH$_4$OH | 0.015 | ○○ | ○ | ○ | ○ |
| Comparative Example 2 | S12 | 0.0025 | HEC | 0.0125 | NH$_4$OH | 0.015 | ○○ | Δ | ○ | ○ |
| Comparative Example 3 | S12 | 0.005 | HEC | 0.0125 | NH$_4$OH | 0.015 | X | X | X | ○ |
| Example 4 | S16 | 0.00005 | HEC | 0.0125 | NH$_4$OH | 0.015 | ○ | ○ | ○ | ○ |
| Example 5 | S16 | 0.0005 | HEC | 0.0125 | NH$_4$OH | 0.015 | ○○ | ○ | ○ | ○ |
| Example 6 | S16 | 0.0015 | HEC | 0.0125 | NH$_4$OH | 0.015 | ○○ | ○ | ○ | ○ |
| Comparative Example 4 | S16 | 0.0025 | HEC | 0.0125 | NH$_4$OH | 0.015 | ○○ | Δ | Δ | ○ |
| Comparative Example 5 | S16 | 0.005 | HEC | 0.0125 | NH$_4$OH | 0.015 | X | X | X | ○ |
| Example 7 | S18 | 0.00005 | HEC | 0.0125 | NH$_4$OH | 0.015 | ○ | ○ | ○ | ○ |
| Example 8 | S18 | 0.0005 | HEC | 0.0125 | NH$_4$OH | 0.015 | ○○ | ○ | ○ | ○ |
| Example 9 | S18 | 0.0015 | HEC | 0.0125 | NH$_4$OH | 0.015 | ○○ | ○ | ○ | ○ |
| Comparative Example 6 | S18 | 0.0025 | HEC | 0.0125 | NH$_4$OH | 0.015 | ○○ | Δ | Δ | ○ |
| Comparative Example 7 | S18 | 0.005 | HEC | 0.0125 | NH$_4$OH | 0.015 | X | X | X | ○ |
| Example 10 | S18* | 0.00005 | HEC | 0.0125 | NH$_4$OH | 0.015 | ○ | ○ | ○ | ○ |
| Example 11 | S18* | 0.0005 | HEC | 0.0125 | NH$_4$OH | 0.015 | ○○ | ○ | ○ | ○ |
| Example 12 | S18* | 0.0015 | HEC | 0.0125 | NH$_4$OH | 0.015 | ○○ | ○ | ○ | ○ |
| Comparative Example 8 | S18* | 0.0025 | HEC | 0.0125 | NH$_4$OH | 0.015 | X | X | X | ○ |
| Comparative Example 9 | S18* | 0.005 | HEC | 0.0125 | NH$_4$OH | 0.015 | X | X | X | ○ |
| Example 13 | S12 | 0.0005 | HEC | 0.0125 | KOH | 0.015 | ○ | ○ | ○ | ○ |
| Example 14 | S12 | 0.0005 | HEC | 0.0125 | TMAH | 0.15 | ○ | ○ | ○ | ○ |
| Example 15 | S12 | 0.0005 | HEC | 0.0125 | PIZ | 0.015 | ○ | ○ | ○ | ○ |
| Comparative Example 10 | S12 | 0.0005 | PVA | 0.01 | NH$_4$OH | 0.015 | X | X | X | ○ |
| Comparative Example 11 | S12 | 0.0005 | PEO | 0.005 | NH$_4$OH | 0.015 | X | X | X | ○ |
| Comparative Example 12 | S12 | 0.0005 | POEPOP | 0.0025 | NH$_4$OH | 0.015 | X | X | X | ○ |
| Comparative Example 13 | S12 | 0.0005 | — | — | NH$_4$OH | 0.015 | X | X | X | ○ |
| Comparative Example 14 | PG1 | 0.0005 | HEC | 0.0125 | NH$_4$OH | 0.015 | Δ | ○ | ○ | ○ |
| Comparative Example 15 | PG2 | 0.0005 | HEC | 0.0125 | NH$_4$OH | 0.015 | ○ | ○ | Δ | ○ |

TABLE 2

| | |
|---|---|
| Polishing machine: | Sheet polishing machine (PNX-322) made by Okamoto Machine Tool Works, Ltd. |
| Load for polishing: | 15 kPa |
| Number of rotations of table: | 30 rpm |
| Number of rotations of head: | 27 rpm |
| Time for polishing: | 4 minutes |
| Temperature of polishing composition: | 20° C. |
| Speed of supply of polishing composition: | 400 ml/min (throwaway) |

As shown in Table 1, results of "excellent" or "good", which are satisfactory for practical use, were gained for all of the evaluation items of Examples 1 to 15. In contrast, at least one evaluation item in Comparative Examples 1 to 15 was "poor" or "somewhat poor," and thus, results which are satisfactory for practical use could not be gained.

The invention claimed is:

1. A polishing composition comprising:
polyoxyethylene sorbitan mono-fatty acid ester, wherein the polyoxyethylene sorbitan mono-fatty acid ester is contained in the polishing composition in an amount no less than 0.0005% by mass and no more than 0.0015% by mass;
silicon dioxide having an average primary particle diameter of 10 nm to 120 nm and an average secondary particle diameter of 20 nm to 500 nm, wherein the silicon dioxide is contained in the polishing composition in an amount no less than 0.05% by mass and no more than 2.5% by mass;
water soluble cellulose, the water soluble cellulose being hydroxyethyl cellulose, hydroxypropyl cellulose, or carboxymethyl cellulose, wherein the water soluble cellulose is contained in the polishing composition in an amount no less than 0.0025% by mass and no more than 0.1% by mass;
an alkaline compound, the alkaline compound being $NH_4OH$, wherein the alkaline compound is contained in the polishing composition in an amount of 0.005% by mass to 0.25% by mass; and
remainder water.

2. The polishing composition according to claim 1, wherein the HLB value of the polyoxyethylene sorbitan mono-fatty acid ester is 8 to 18.

3. The polishing composition according to claim 2, wherein the HLB value of the polyoxyethylene sorbitan mono-fatty acid ester is 14 to 17.

4. The polishing composition according to claim 1, wherein the silicon dioxide is colloidal silica or fumed silica.

5. The polishing composition according to claim 1, wherein the viscosity average molecular weight of the water soluble cellulose is 100,000 to 3,000,000.

6. The polishing composition according to claim 1, wherein the polishing composition is used in final polishing of a silicon wafer.

7. A method for polishing a silicon wafer, comprising final polishing of a silicon wafer using a polishing composition which includes:
polyoxyethylene sorbitan mono-fatty acid ester, wherein the polyoxyethylene sorbitan mono-fatty acid ester is contained in the polishing composition in an amount no less than 0.0005% by mass and no more than 0.0015% by mass;
silicon dioxide having an average primary particle diameter of 10 nm to 120 nm and an average secondary particle diameter of 20 nm to 500 nm, wherein the silicon dioxide is contained in the polishing composition in an amount no less than 0.05% by mass and no more than 2.5% by mass;
water soluble cellulose, the water soluble cellulose being hydroxyethyl cellulose, hydroxypropyl cellulose, or carboxymethyl cellulose, wherein the water soluble cellulose is contained in the polishing composition in an amount no less than 0.0025% by mass and no more than 0.1% by mass;
an alkaline compound, the alkaline compound being $NH_4OH$, wherein the alkaline compound is contained in the polishing composition in an amount of 0.005% by mass to 0.25% by mass and
remainder water.

* * * * *